(12) United States Patent
Levari et al.

(10) Patent No.: US 12,316,676 B2
(45) Date of Patent: May 27, 2025

(54) THREAT ANALYTICS AND DYNAMIC COMPLIANCE IN SECURITY POLICIES

(71) Applicant: Cisco Technology, Inc., San Jose, CA (US)

(72) Inventors: Doron Levari, Newton, MA (US); Tariq Ahmed Farhan, Cambridge, MA (US); Vincent E. Parla, North Hampton, NH (US); Ido Tamir, Boston, MA (US); Adam Bragg, Hollis, NH (US); Jason M Perry, Plymouth, MA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 17/871,827

(22) Filed: Jul. 22, 2022

(65) Prior Publication Data

US 2024/0031411 A1    Jan. 25, 2024

(51) Int. Cl.
*H04L 29/06*    (2006.01)
*H04L 9/40*    (2022.01)

(52) U.S. Cl.
CPC .......... *H04L 63/20* (2013.01); *H04L 63/1416* (2013.01)

(58) Field of Classification Search
CPC ........................... H04L 63/20; H04L 63/1416
See application file for complete search history.

(56) References Cited

U.S. PATENT DOCUMENTS

| | | | |
|---|---|---|---|
| 9,398,031 B1 | 7/2016 | Ranadive et al. | |
| 11,184,404 B1* | 11/2021 | Hatch | H04L 63/205 |
| 2006/0059253 A1* | 3/2006 | Goodman | G06Q 10/10 |
| | | | 709/223 |
| 2007/0150934 A1* | 6/2007 | Fiszman | H04L 63/102 |
| | | | 726/1 |
| 2007/0180490 A1* | 8/2007 | Renzi | G06F 21/604 |
| | | | 726/1 |
| 2010/0242088 A1* | 9/2010 | Thomas | G06F 21/554 |
| | | | 726/4 |
| 2014/0115703 A1 | 4/2014 | Penton et al. | |
| 2015/0281278 A1* | 10/2015 | Gooding | H04L 63/20 |
| | | | 726/1 |
| 2019/0116193 A1* | 4/2019 | Wang | G06N 20/00 |
| 2020/0076845 A1 | 3/2020 | Mathew | |
| 2021/0168167 A1 | 6/2021 | Kirti et al. | |
| 2021/0184928 A1* | 6/2021 | Lal | H04L 41/5048 |
| 2022/0038468 A1 | 2/2022 | Jeevagunta et al. | |

OTHER PUBLICATIONS

Ayed et al., "An Event Processing Approach for Threats Monitoring of Service Compositions", 2013 International Conference on Risks and Security of Internet and Systems (CRISIS), Date of Conference: Oct. 23-25, 2013.*

Search Report and Written Opinion for International Application No. PCT/US2023/028215, Dated May 16, 2024, 13 pages.

* cited by examiner

*Primary Examiner* — Morshed Mehedi
(74) *Attorney, Agent, or Firm* — Lee & Hayes, P.C.

(57) ABSTRACT

This disclosure describes techniques and mechanisms for defining dynamic security compliance in networks to proactively prevent security policy violations from being added and/or made, retroactively and continuously identify security policy violations based on data from the changing threat landscape, and provide auto-remediation of non-compliant security policies. The techniques enable automated security policies and provide improved network security against a dynamic threat landscape.

20 Claims, 7 Drawing Sheets

THREAT ANALYTICS AND DYNAMIC COMPLIANCE IN SECURITY POLICIES

TECHNICAL FIELD

The present disclosure relates generally to the field of computer networking, and more particularly to providing dynamic security compliance in a network.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of service networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In particular, Enterprise and Hyper-scalar networks today are dynamic and subject to continuous change. A critical component of these changes are security policy updates, which are used to facilitate network changes. Threats to a network are also dynamic, resulting in a dynamic threat landscape. For instance, malicious networks and domains (e.g., IP addresses, URLs, etc.) may continuously change. Current techniques offer firewalls, however, firewall security policies are typically static in nature.

Intrusion Prevention Systems (IPS) is one existing solution that can retroactively check what application traffic is going through a network and can determine whether a security policy needs to and/or can be modified. However, IPS functionalities are generally retroactive, in that they do not restrict a user and/or a network administrator from adding new security policies that may result in opening the network to threats. Moreover, while IPS may identify whether a security policy needs to be changed, a user must manually make the change to the security policy. Also, IPS is limited to a subset of the threat landscape—i.e., application threats like malwares, spywares, virus, etc., and thus, does not apply to networks and URL constructs. Moreover, security policies in general are static, such that there is no facility to dynamically update and/or modify security policies based on environmental changes (e.g., such as an entity going from a good reputation (e.g., the entity is not a threat) to a bad reputation (e.g., the entity may be a threat) after a security policy has been provisioned and/or set by a network administrator).

Accordingly, there is a need for a "dynamic security compliance" model and architecture for dynamic networks that proactively prevents violations, retroactively identifies violations with changing threat landscape continuously, and provides auto-remediation as necessary.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
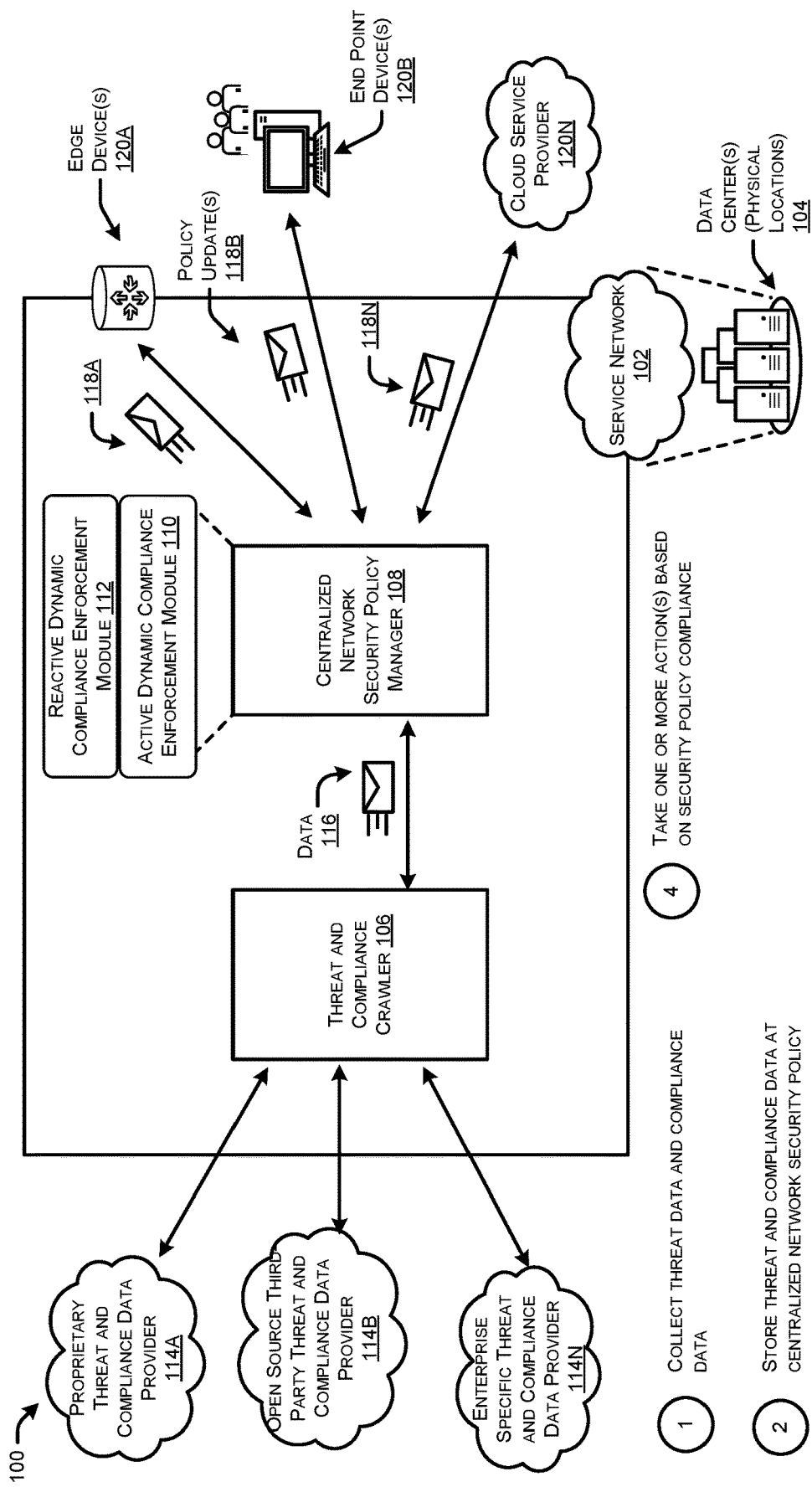
FIG. 1 illustrates a system-architecture diagram of an environment in which a dynamic security compliance system that can perform active dynamic compliance enforcement and/or reactive dynamic compliance enforcement within a network.

The present disclosure relates generally to the field of computer networking, and more particularly to defining dynamic security compliance in networks to proactively prevent security policy violations from being added and/or made, retroactively and continuously identify security policy violations based on data from the changing threat landscape, and provide auto-remediation of non-compliant security policies.

A method to perform techniques for active dynamic compliance enforcement are described herein may be implemented by a centralized network security policy manager and may include receiving threat data from one or more threat and compliance data providers; receiving input indicating a change event to one or more security policies within a network; determining whether to approve the change event based at least in part on the threat data and the input; and based at least in part on determining to approve the change event, sending an updated security policy to one or more enforcement endpoints; or based at least in part on determining to deny the change event, outputting an indication that the change event is non-compliant.

A method to perform techniques for reactive dynamic compliance enforcement are described herein may be implemented by a centralized network security policy manager and may include receiving threat data from one or more threat and compliance data providers; accessing one or more security policies associated with a network; determining, based at least in part on the threat data, whether the one or more security policies are non-compliant; in response to determining that a first security policy of the one or more security policies is non-compliant, performing a remedial action on the first security policy; and in response to determining that a second security policy of the one or more security policies is compliant, storing an indication that the second security policy is compliant.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modem-day networks deliver various types of service networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

In particular, Enterprise and Hyper-scalar networks today are dynamic and subject to continuous change. A critical component of these changes are security policy updates, which are used to facilitate network changes. Threats to a network are also dynamic, resulting in a dynamic threat landscape. For instance, malicious networks and domains (e.g., IP addresses, URLs, etc.) may continuously change. Current techniques offer firewalls, however, firewall security policies are typically static in nature.

Intrusion Prevention Systems (IPS) is one existing solution that can retroactively check what application traffic is going through a network and can determine whether a security policy needs to and/or can be modified. However, IPS functionalities are generally retroactive, in that they do not restrict a user and/or a network administrator from adding new security policies that may result in opening the network to threats. Moreover, while IPS may identify whether a security policy needs to be changed, a user must manually make the change to the security policy. Also, IPS is limited to a subset of the threat landscape—i.e., application threats like malwares, spywares, virus, etc., and thus, does not apply to networks and URL constructs. Moreover, security policies in general are static, such that there is no facility to dynamically update and/or modify security policies based on environmental changes (e.g., such as an entity going from a good reputation (e.g., the entity is not a threat) to a bad reputation (e.g., the entity may be a threat) after a security policy has been provisioned and/or set by a network administrator).

Accordingly, there is a need for a "dynamic security compliance" model and architecture for dynamic networks that proactively prevents violations, retroactively identifies violations with changing threat landscape continuously, and provides auto-remediation as necessary.

This disclosure describes techniques and mechanisms for a system to enable dynamic security compliance in networks to proactively prevent security policy violations from being added and/or made, retroactively and continuously identify security policy violations based on data from the changing threat landscape, and provide auto-remediation of non-compliant security policies. In some examples, the system may perform active dynamic compliance enforcement. The system may receive threat data from one or more threat and compliance data providers; receive input indicating a change event to one or more security policies within a network; determine whether to approve the change event based at least in part on the threat data and the input; and based at least in part on determining to approve the change event, send an updated security policy to one or more enforcement endpoints; or based at least in part on determine to deny the change event, outputting an indication that the change event is non-compliant.

Additionally or alternatively, the system may perform reactive dynamic compliance enforcement. The system may receive threat data from one or more threat and compliance data providers; access one or more security policies associated with a network; determine, based at least in part on the threat data, whether the one or more security policies are non-compliant; in response to determining that a first security policy of the one or more security policies is non-compliant, performing a remedial action on the first security policy; and in response to determining that a second security policy of the one or more security policies is compliant, storing an indication that the second security policy is compliant.

In some examples, the system may comprise a threat and compliance crawler. For instance, the threat and compliance crawler may correspond to a web crawler. In some examples, the threat and compliance crawler may collect threat data and compliance data from one or more sources (e.g., proprietary threat intelligence threat and compliance data provider(s), open-source threat intelligence threat and compliance data provider(s), and/or enterprise specific third party threat and compliance data provider(s)). The threat and compliance crawler may build a central index of known threats and compliance rules into a central index. In some examples, the central index is stored in a database of the system.

In some examples, the threat and compliance crawler may comprise a pre-trained model and/or pre-trained weighted model. In some examples, the threat and compliance crawler is pre-trained using machine learning techniques. In some examples, the orchestration system stores machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs.

In some examples, the system may comprise a centralized network security policy manager. In some examples, the centralized network security policy manager corresponds to a system that has complete visibility into the security fabric of a given network (e.g., enterprise network, smaller network, etc.) and/or is the central point of security policy management within the network. For instance, the centralized network security policy manager may be configured to communicate with the threat and compliance crawler to receive data (e.g., threat data, compliance data, etc.). The centralized network security policy manager may store data associated with enforcement points within the network. In some examples, the centralized network security policy manager may proactively enforce and/or reactively monitor dynamic compliance at one or more enforcement endpoints (e.g., edge firewall, end-point firewall, cloud firewall, etc.).

In some examples, the centralized network security policy manager may comprise an active dynamic compliance enforcement module. In some examples, the active dynamic compliance enforcement module is configured to receive input indicating that security policies are actively being modified (e.g., such as by network administrators) and determine whether the modification results in a security policy change that is non-compliant (e.g., either opens the network to malicious content or opens the network to out-of-compliant resources/networks (e.g., sanctions, specific enterprise compliance rules)). Where the modification is determined to be non-compliant (e.g., opens the active dynamic compliance enforcement module may prevent the change from being made. Where the modification is determined to be compliant the active dynamic compliance enforcement module may push the change and/or updated security policy to one or more of the enforcement endpoints.

In some examples, the centralized network security policy manager may comprise a reactive dynamic compliance enforcement module. In some examples, the reactive dynamic compliance enforcement module is configured to retroactively identify any security policy in a network that goes out of compliance and immediately and/or automatically remediate the non-compliant security policy. In some examples, the reactive dynamic compliance enforcement module may access threat data and/or compliance data to determine whether one or more security policies are non-compliant. In some examples, the reactive dynamic compliance enforcement module may determine whether security policies are non-compliant at intervals (e.g., every hour, day, week, or any other suitable period of time) and/or in response to receiving new threat data and/or new compliance data.

In this way, the system can enable dynamic compliance by enabling security policies to automate themselves to be secure from dynamically changing threats. Additionally, by proactively denying security policy changes that are non-compliant from being implemented, the system prevents the network from being open to threats and improves security. Moreover, by retroactively and continuously identifying non-compliant security policies and providing remedial actions, the system provides an automated dynamic retroactive compliance which previously was not available. Further, by utilizing enterprise specific data (e.g., such as sanctions, and other information), the claimed techniques ensure that security policies stay compliant in a dynamic threat landscape.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a dynamic security compliance system 100 that can perform active dynamic compliance enforcement and/or reactive dynamic compliance enforcement within a network.

In some examples, the system 100 may include a service network 102 that includes devices housed or located in one or more data centers 104. The service network 102 may include one or more networks implemented by any viable communication technology, such as wired and/or wireless modalities and/or technologies. The service network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may include devices, virtual resources, or other nodes that relay packets from one network segment to another by nodes in the computer network. The service network 102 may include multiple devices that utilize the network layer (and/or session layer, transport layer, etc.) in the OSI model for packet forwarding, and/or other layers.

The one or more data centers 104 may be physical facilities or buildings located across geographic areas that designated to store networked devices that are part of service network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based threat and compliance data provider needs. Generally, the data centers 104 (physical and/or virtual) may provide basic resources such as processor (CPU), memory (RAM), storage (disk), and networking (bandwidth). However, in some examples the devices in the packet-forwarding service networks 102 may not be located in explicitly defined data centers 104, but may be located in other locations or buildings.

The system 100 may comprise a threat and compliance crawler 106. In some examples, the threat and compliance crawler 106 may correspond to a web crawler. In some examples, the threat and compliance crawler 106 may collect threat data and compliance data from one or more sources 114 (e.g., proprietary threat intelligence threat and compliance data provider(s) 114A, open-source threat intelligence threat and compliance data provider(s) 114B, and/or enterprise specific third-party threat and compliance data provider(s) 114N). For instance, where the service network 102 is hosted by Cisco, the proprietary threat and compliance data provider 114A may correspond to a threat intelligence platform (e.g., such as TALOS) that is owned by Cisco and offers insight on threats and/or threat feeds. The open source third-party threat and compliance data provider 114B may correspond to one or more open source threat intelligence sources (E.g., such as VirusTotal, etc.). The enterprise specific third-party threat and compliance data provider(s) 114N may correspond to one or more sources indicating enterprise specific information (e.g., Sanctions, etc.). In some examples, the threat and compliance crawler 106 may build a central index of threats and compliance rules into a central index. In some examples, the central index is stored in a database of the system. In some examples, the threat and compliance crawler 106 collects threat and compliance data and updates the central index at a regular cadence (e.g., every hour, day, week, or any other suitable period of time).

The system 100 may comprise a centralized network security policy manager 108. In some examples, the centralized network security policy manager 108 corresponds to a system that has complete visibility into the security fabric of a given network (e.g., enterprise network, smaller network, etc.) and/or is the central point of security policy management within the network. In some examples, the centralized network security policy manager may be integrated as part of Cisco Defense Operator (CDO). For instance, the centralized network security policy manager may be configured to communicate with the threat and compliance crawler 106 to receive data (e.g., threat data, compliance data, etc.) and store the data in a dynamic data store. The centralized network security policy manager 108 may store additional data associated with enforcement endpoints 120 within the network. In some examples, the centralized network security policy manager may proactively enforce and/or reactively monitor dynamic compliance at the one or more enforcement endpoints (e.g., edge firewall, end-point firewall, cloud firewall, etc.). In some examples, the centralized network security policy manager 108 may manage various types of firewalls (e.g., FTD, ASA, MX, etc.) in the network.

In some instances, the centralized network security policy manager 108 comprises a network device and is included as part of a service network 102. The service network 102 may generally include, manage, or otherwise be associated with one or more applications or services utilized by users accessing network(s). Network(s) may comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The service network 102 may provide any type of application or service for use by users of client devices (not shown). However, in other instances the orchestration system 110 may be associated with any type of computing device and be used for any purpose. In some examples, the centralized network security policy manager 108 comprises a router, a switch, or any other type of device included in a service network.

As illustrated the centralized network security policy manager 108 may include an active dynamic compliance enforcement module 110 and/or a reactive dynamic compliance enforcement module 112. The active dynamic compliance enforcement module 110 may be configured to receive input indicating that security policies are actively being modified. For instance, the active dynamic compliance enforcement module 110 may receive an input from a network administrator that indicates a change and/or modification to a security policy. For example, the modification may comprise an indication to allow users of the network to access an IP address, uniform resource locator (URL), etc. The active dynamic compliance enforcement module 110 may determine whether the modification results in a security policy change that is non-compliant (e.g., either opens the network to malicious content or opens the network to out-of-compliant resources and/or networks (e.g., sanctions, specific enterprise compliance rules)). For instance, the active dynamic compliance enforcement module 110 may access threat data and/or compliance data 116 and determine, based at least in part on the data, whether the URL, IP address, etc. is malicious and/or would open the network to out-of-compliant resources and/or networks. As an example, the active dynamic compliance enforcement module 110 may determine that enabling users to access the IP address and/or URL would violate a sanction imposed on a particular country. Accordingly, in this example, the active dynamic compliance enforcement module 110 may deny the change to the security policy. Where the modification is determined to be compliant the active dynamic compliance enforcement module 110 may push the change and/or updated security policy to one or more of the enforcement endpoints.

The reactive dynamic compliance enforcement module 112 may be configured to retroactively identify any security policy in a network that goes out of compliance and immediately and/or automatically remediate the non-compliant security policy. In some examples, the reactive dynamic compliance enforcement module 112 may access threat data and/or compliance data to determine whether one or more security policies are non-compliant. In some examples, the reactive dynamic compliance enforcement module 112 may perform scans of security policies and/or threat data and/or compliance data. The scans may be performed at a regular cadence (e.g., every hour, day, week, or any other suitable period of time) and/or in response to receiving new threat data and/or new compliance data being stored by the centralized network security policy manager 108. For instance, the reactive dynamic compliance enforcement module 112 may, when scanning the security policies, access threat data and/or compliance data 116. The reactive dynamic compliance enforcement module 112 may determine, based at least in part on the threat data and/or compliance data, whether the URL, IP address, etc. is malicious and/or would open the network to out-of-compliant resources and/or networks. As an example, the reactive dynamic compliance enforcement module 112 may determine that an existing security policy that enables users to access a particular IP address and/or URL is in violation a sanction imposed on a particular country. Accordingly, in this example, the reactive dynamic compliance enforcement module 112 may automatically perform a remedial action. For instance, the reactive dynamic compliance enforcement module 112 may, without user input, generate an updated security policy that denies access to the particular IP address and/or URL and push the updated security policy to one or more enforcement endpoints 120.

As illustrated, the centralized network security policy manager 108 may communicate with one or more enforcement endpoint(s) 120. As illustrated, the enforcement endpoint(s) 120 may comprise one or more of edge device(s) 120A, end point device(s) 120B, and/or cloud threat and compliance data provider 120N. In some examples, the enforcement endpoint(s) 120 may correspond to one or more firewalls. In some examples, the centralized network security policy manager 108 may send policy update(s) 118 to one or more of the enforcement endpoint(s) 120, such as in response to determining an active modification is compliant (e.g., via the active dynamic compliance enforcement module 110) and/or determining a security policy is non-compliant (e.g., via the reactive dynamic compliance enforcement module 112).

At "1", the system collects threat and compliance data. For instance, the system may collect the threat and compliance data using the threat and compliance crawler 106. As noted above, the threat and compliance crawler 106 may build a central index of threats and compliance rules into a central index. In some examples, the threat and compliance crawler 106 collects threat and compliance data and updates the central index at a regular cadence (e.g., every hour, day, week, or any other suitable period of time).

At "2", the system may store the threat and compliance data at the centralized network security policy manager 108. For instance, the central index may be stored in a database of the centralized network security policy manager 108.

At "3", the system may actively and/or reactively determine whether one or more security policies are compliant with the threat and compliance data. For instance, as described above, the centralized network security policy manager may actively enforce dynamic security policy changes via an active dynamic compliance enforcement module 110. As noted above, the centralized network security policy manager may reactively identify non-compliant security policies and auto-remediate the non-compliant security policies via a reactive dynamic compliance enforcement module 112.

At "4", the system may take one or more action(s) based on whether the security policies are compliant. For instance, as described above, where an active policy change is received (e.g., such as a change to a security policy from a network administrator), the centralized network security policy module 108 may determine whether to allow the change and/or deny the change. In this example, the action(s) may comprise allowing the change to the security policy to be made and/or blocking the change to the security policy from being made. Additionally and/or alternatively, and as described above, where the centralized network security manager 108 reactively determines that a security policy is non-compliant, the centralized network security policy module 108 may auto-remediate the security policy in order to bring it back into compliance. The auto-remediation of the security policy may occur without input from user(s) or a network administrator.

In this way, the system can enable dynamic compliance by enabling security policies to automate themselves to be secure from dynamically changing threats. Additionally, by proactively denying security policy changes that are non-compliant from being implemented, the system prevents the network from being open to threats and improves security. Moreover, by retroactively and continuously identifying non-compliant security policies and providing remedial actions, the system provides an automated dynamic retroactive compliance which previously was not available. Further, by utilizing enterprise specific data (e.g., such as sanctions, and other information), the claimed techniques ensure that security policies stay compliant in a dynamic threat landscape.

Figure 2:
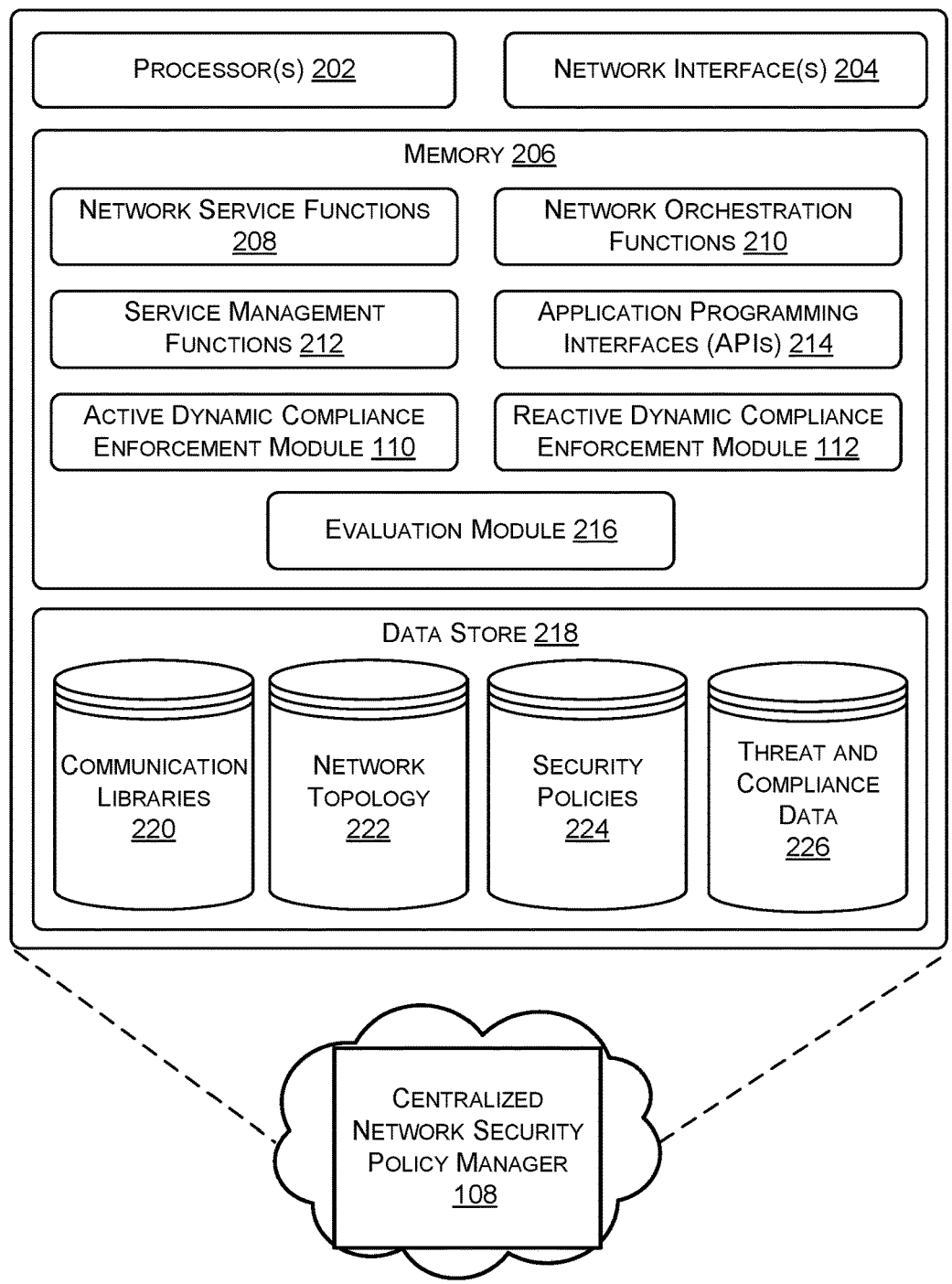
FIG. 2 illustrates a component diagram of an example centralized network security policy manager described in FIG. 1.

FIG. 2 illustrates a component diagram of an example centralized network security policy manager described in FIG. 1. In some instances, the centralized network security policy manager 108 may run on one or more computing devices in, or associated with, the service network 102 (e.g., a single device or a system of devices). The centralized network security policy manager 108 may comprise a single controller that is running, or multiple instances of a network controller running at least partly at a same time.

Generally, the centralized network security policy manager 108 may include a programmable controller that manages some or all of the control plane activities of the service network 102, and manages or monitors the network state using one or more centralized control models.

As illustrated, the centralized network security policy manager 108 may include, or run on, one or more hardware processors 202 (processors), one or more devices, configured to execute one or more stored instructions. The processor(s) 202 may comprise one or more cores. Further, the orchestration system 110 may include or be associated with (e.g., communicatively coupled to) one or more network interfaces 204 configured to provide communications with the edge device(s) 124 and other devices, and/or other systems or devices in the service network 102 and/or remote from the service network 102. The network interfaces 204 may include devices configured to couple to personal area networks (PANs), wired and wireless local area networks (LANs), wired and wireless wide area networks (WANs), and so forth. For example, the network interfaces 204 may include devices compatible with any networking protocol.

The centralized network security policy manager 108 may also include memory 206, such as computer-readable media, that stores various executable components (e.g., software-based components, firmware-based components, etc.). The memory 206 may generally store components to implement functionality described herein as being performed by the orchestration system 110. The memory 206 may store one or more network service functions 208, such as a slicing manager, a topology manager to manage a topology of the service network 102, a host tracker to track what network components are hosting which programs or software, a switch manager to manage switches of the service network 102, a process manager, and/or any other type of function performed by the orchestration system 110.

The centralized network security policy manager 108 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the service network 102 (configurable), and one or more APIs 214 for communicating with devices in the service network 102 and causing various control plane functions to occur.

Further, the centralized network security policy manager 108 may include an active dynamic compliance enforcement module 110. As described above, the active dynamic compliance enforcement module 110 may be configured to receive input indicating that security policies are actively being modified. For instance, the active dynamic compliance enforcement module 110 may receive an input from a network administrator that indicates a change and/or modification to a security policy. For example, the modification may comprise an indication to allow users of the network to access an IP address, uniform resource locator (URL), etc. The active dynamic compliance enforcement module 110 may determine whether the modification results in a security policy change that is non-compliant (e.g., either opens the network to malicious content or opens the network to out-of-compliant resources and/or networks (e.g., sanctions, specific enterprise compliance rules)). For instance, the active dynamic compliance enforcement module 110 may access threat data and/or compliance data 116 and determine, based at least in part on the data, whether the URL, IP address, etc. is malicious and/or would open the network to out-of-compliant resources and/or networks. As an example, the active dynamic compliance enforcement module 110 may determine that enabling users to access the IP address and/or URL would violate a sanction imposed on a particular country. Accordingly, in this example, the active dynamic compliance enforcement module 110 may deny the change to the security policy. Where the modification is determined to be compliant the active dynamic compliance enforcement module 110 may push the change and/or updated security policy to one or more of the enforcement endpoints.

The centralized network security policy manager 108 may include a reactive dynamic compliance enforcement module 112. As described above, the reactive dynamic compliance enforcement module 112 may be configured to retroactively identify any security policy in a network that goes out of compliance and immediately and/or automatically remediate the non-compliant security policy. In some examples, the reactive dynamic compliance enforcement module 112 may access threat data and/or compliance data to determine whether one or more security policies are non-compliant. In some examples, the reactive dynamic compliance enforcement module 112 may perform scans of security policies and/or threat data and/or compliance data. The scans may be performed at a regular cadence (e.g., every hour, day, week, or any other suitable period of time) and/or in response to receiving new threat data and/or new compliance data being stored by the centralized network security policy manager 108. For instance, the reactive dynamic compliance enforcement module 112 may, when scanning the security policies, access threat data and/or compliance data 116. The reactive dynamic compliance enforcement module 112 may determine, based at least in part on the threat data and/or compliance data, whether the URL, IP address, etc. is malicious and/or would open the network to out-of-compliant resources and/or networks. As an example, the reactive dynamic compliance enforcement module 112 may determine that an existing security policy that enables users to access a particular IP address and/or URL is in violation of a sanction imposed on a particular country. Accordingly, in this example, the reactive dynamic compliance enforcement module 112 may automatically perform a remedial action. For instance, the reactive dynamic compliance enforcement module 112 may, without user input, generate an updated security policy that denies access to the particular IP address and/or URL and push the updated security policy to one or more enforcement endpoints 120.

Further the centralized network security policy manager 108 may include an evaluation module 216. In some examples, the evaluation module 216 may evaluate one or more of the security policies, modification(s) to the security policies, and/or threat and compliance data. In some examples, the evaluation module 216 may perform the actions of the active dynamic compliance enforcement module 110 and/or the reactive dynamic compliance enforcement module 112. In some examples, the evaluation module 216 evaluates each security policy, modification(s), and/or threat and compliance data in order to determine whether (i) an active policy change is compliant and/or (ii) an existing security policy needs to be auto-remediated.

The centralized network security policy manager 108 may further include a data store 218, such as long-term storage, that stores communication libraries 220 for the different communication protocols that the orchestration system 110 is configured to use or perform. Additionally, the data store 218 may include network topology data 222, such as a model representing the layout of the network components in the service network 102 and/or data indicating available bandwidth, available CPU, delay between nodes, computing capacity, processor architecture, processor type(s), etc. The data store 218 may store security policies 224 that includes security data associated with the network, security policies configured for the network, and/or compliance policies configured for the network. Additionally, the data store 218 may include threat and compliance data 226, which may include threat data and/or compliance data received from the threat and compliance crawler 106 described above.

Figure 3A:
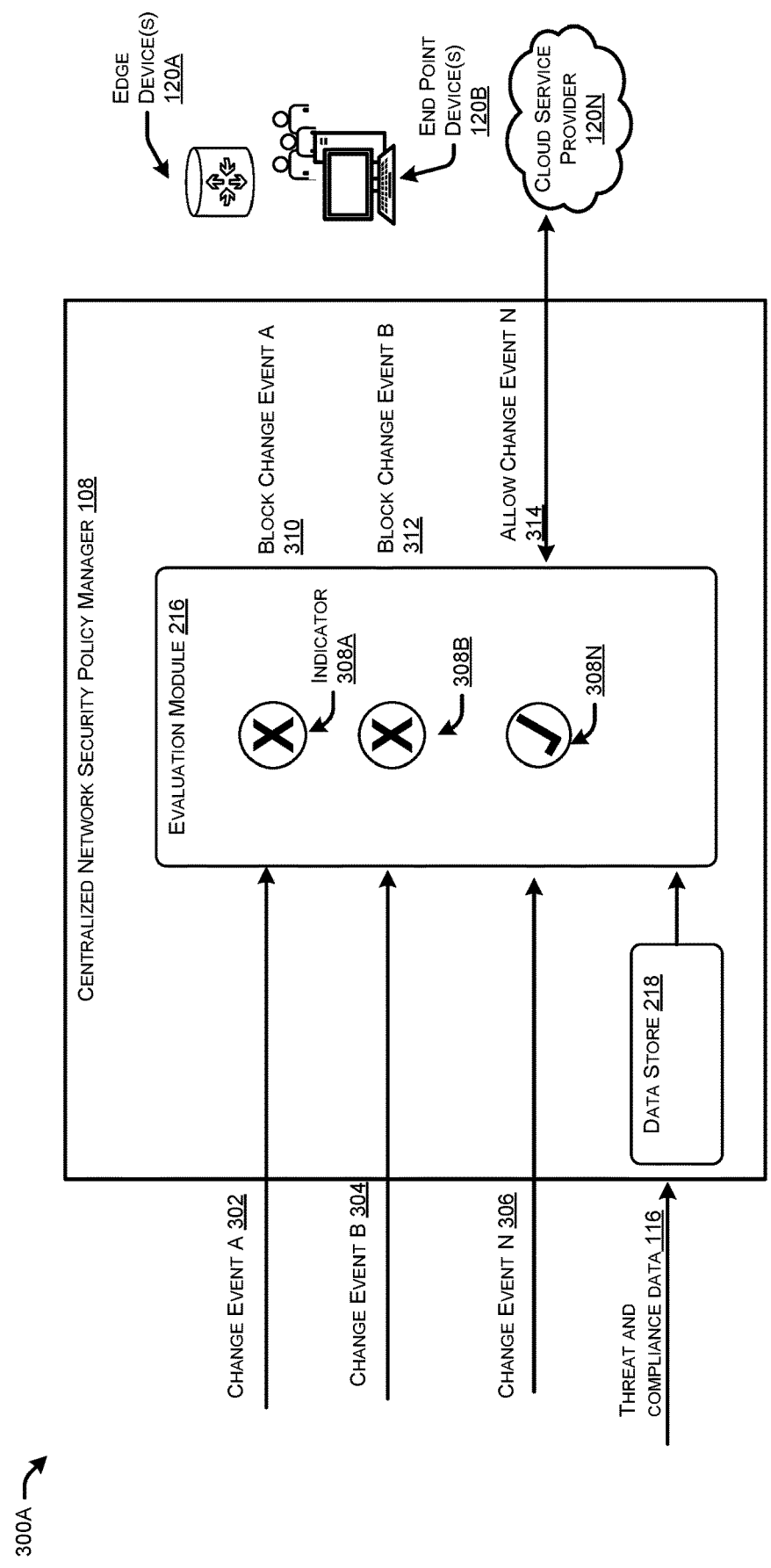
FIG. 3A illustrates a flow diagram of example input(s) and output(s) to the centralized network security policy module described in FIGS. 1 and 2, and shows enforcement of active dynamic compliance by blocking a change event from an administrator.

FIG. 3A illustrates a flow diagram 300A of example input(s) and output(s) to the centralized network security policy module 108 described in FIGS. 1 and 2, and shows enforcement of active dynamic compliance by blocking a change event from an administrator. As illustrated in FIG. 3A, the centralized network security policy manager 108 comprises an evaluation module 216 and data store 218 as described above. The centralized network security policy module 108 may receive one or more inputs. For instance, as described above, centralized network security policy module 108 may receive threat and compliance data 116 as input from a threat and compliance crawler 106. As illustrated in FIG. 3A and described above, the centralized network security policy module 108 may store the threat and compliance data 116 in one or more data store(s) 218.

As illustrated in FIG. 3A, the centralized network security policy module 108 may also receive one or more change event(s) 302, 304, 306, as input. For instance, the one or more change event(s) 302, 304, 306 may be received from an administrator of the network, such as via a user interface provided by the centralized network security policy module 108. In some examples, the one or more change event(s) 302, 304, 306 comprise addition(s) of new security policies, modification(s) of existing security policies, and/or removal of security policies. For instance, change event A 302 may comprise a request to modify a security policy to allow a particular IP address to be accessible to users of the network. Change event B 304 may comprise a request to modify a security policy to allow users of the network to access a particular URL. Change event N 306 may comprise a request to add a particular domain to a security policy, to enable users of the network to access the particular domain. In this example and as illustrated in FIG. 3A, the evaluation module 216 may receive the change event(s) 302, 304, 306 as input and may receive and/or access data (e.g., threat and compliance data and/or security policy data) from the data store 216. The evaluation module 216 may determine, based at least in part on the data, whether to approve or deny the change event(s) 302, 304, 306. For instance, the evaluation module 216 may determine to deny change event A (indicated by indicator 308A) based on determining the particular IP address is included in the threat and compliance data (e.g., thereby indicating the particular IP address is malicious and/or a threat to the network). As illustrated, at 310 the evaluation module 216 and/or centralized network security policy manager 108 may block change event A from taking place and/or being sent to an enforcement endpoint (e.g., such as edge device(s) 120A).

The evaluation module 216 may determine to deny change event B (indicated by indicator 308B), based on determining the particular URL is included in the threat and compliance data 116. As illustrated, at 312 the evaluation module 216 and/or centralized network security policy manager 108 may block change event B from taking place and/or being sent to an enforcement endpoint (e.g., such as end point device(s) 120B).

The evaluation module 216 may determine to allow change event N (indicated by indicator 308N), based on determining the particular domain is not included in the threat and compliance data 116, thereby indicating that the particular domain is not malicious. Additionally, or alternatively, the evaluation module 216 may determine to allow change event N based on determining the particular domain does not violate one or more enterprise specific compliance policies (e.g., such as sanction(s) imposed on a particular country, etc.). In some examples, the compliance policies and/or information is included as part of the threat and compliance data 116. As illustrated, at 314, the evaluation module 216 and/or centralized network security policy manager 108 may generate an updated security policy and push the updated security policy to an enforcement endpoint (e.g., such as the cloud threat and compliance data provider 120N). In some examples, the evaluation module 216 and/or centralized network security policy manager 108 may send the change event 306 to the enforcement endpoint 120N for implementation.

Figure 3B:
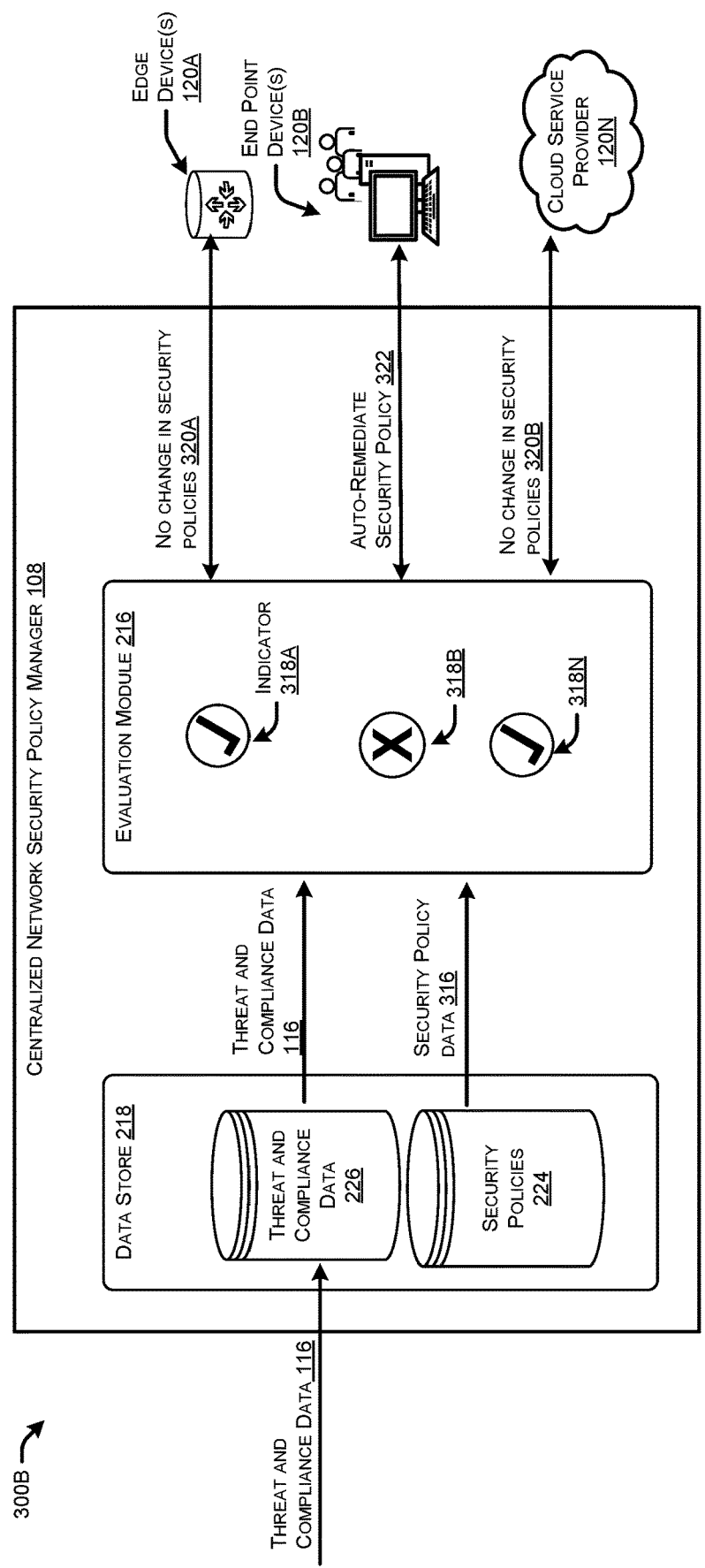
FIG. 3B illustrates a flow diagram of example input(s) and output(s) corresponding to the centralized network security policy module described in FIGS. 1 and 2, and shows enforcement of reactive dynamic compliance by automatically correcting existing security policies.

FIG. 3B illustrates a flow diagram 300B of example input(s) and output(s) to the centralized network security policy module 108 described in FIGS. 1 and 2, and shows enforcement of reactive dynamic compliance by automatically correcting existing security policies.

As illustrated in FIG. 3B, the centralized network security policy manager 108 comprises an evaluation module 216 and data store 218 (including threat and compliance data 226 and security policies 224) as described above. In this example, there is no user and/or administrator input, such that the security policies 224 have already been configured. As illustrated, the centralized network security policy module 108 may receive threat and compliance data 116 as input from a threat and compliance crawler 106. As illustrated in FIG. 3B and described above, the centralized network security policy module 108 may store the threat and compliance data 116 in one or more data store(s) 218.

As illustrated in FIG. 3B, the evaluation module 216 may access and/or receive threat and compliance data 116 and/or security policy data 316 (e.g., data associated with existing security policies) from the data store(s) 216. As noted above, the evaluation module 216 may analyze the threat and compliance data 116 and/or security policy data 316 to determine whether one or more existing security policies are non-compliant. As illustrated in FIG. 3B, the evaluation module 216 may determine that a first security policy is compliant (e.g., indicated by indicator 318A). In this example, at 320A, the evaluation module 216 and/or centralized network security policy module 108 may store an indication that the first security policy is compliant and continue providing service(s) to the enforcement endpoint (e.g., edge device(s) 120A.

The evaluation module 216 may determine that a second security policy is non-compliant (e.g., indicated by indicator 318B). As an example, an existing security policy may be configured to allow users of the network to access a particular country from the secure network. The evaluation module 216 may determine, based on the threat and compliance data 116, that the particular country is using a new IP address that is exposing resources. In this example, under the existing security policy, users of the network would be allowed to access the new IP address based on the existing security policy, which would open the network to harm. Accordingly, the evaluation module 216 may identify the new IP address as potentially malicious and perform one or more remedial action(s). For instance, as noted above, at 322 the evaluation module 216 and/or centralized network security policy module 108 may generate and/or send an updated security policy to one or more enforcement endpoint(s) (e.g., such as endpoint device(s) 120B). In some examples, the updated security policy may indicate that user(s) of the network may not access the new IP address associated with the particular country and/or may block access to domain(s) associated with the particular country. In some examples, the remedial action(s) may comprise one or more of a change in a security policy, disallowing access to a particular IP address, disallowing access to a particular domain, disallowing access to a particular URL, or any other suitable remedial action).

As illustrated in FIG. 3B, the evaluation module 216 may determine that a third security policy is compliant (e.g., indicated by indicator 318N). In this example, at 320B, the evaluation module 216 and/or centralized network security policy module 108 may store an indication that the third security policy is compliant and continue providing service(s) to the enforcement endpoint (e.g., cloud threat and compliance data provider 120N).

Figure 4:
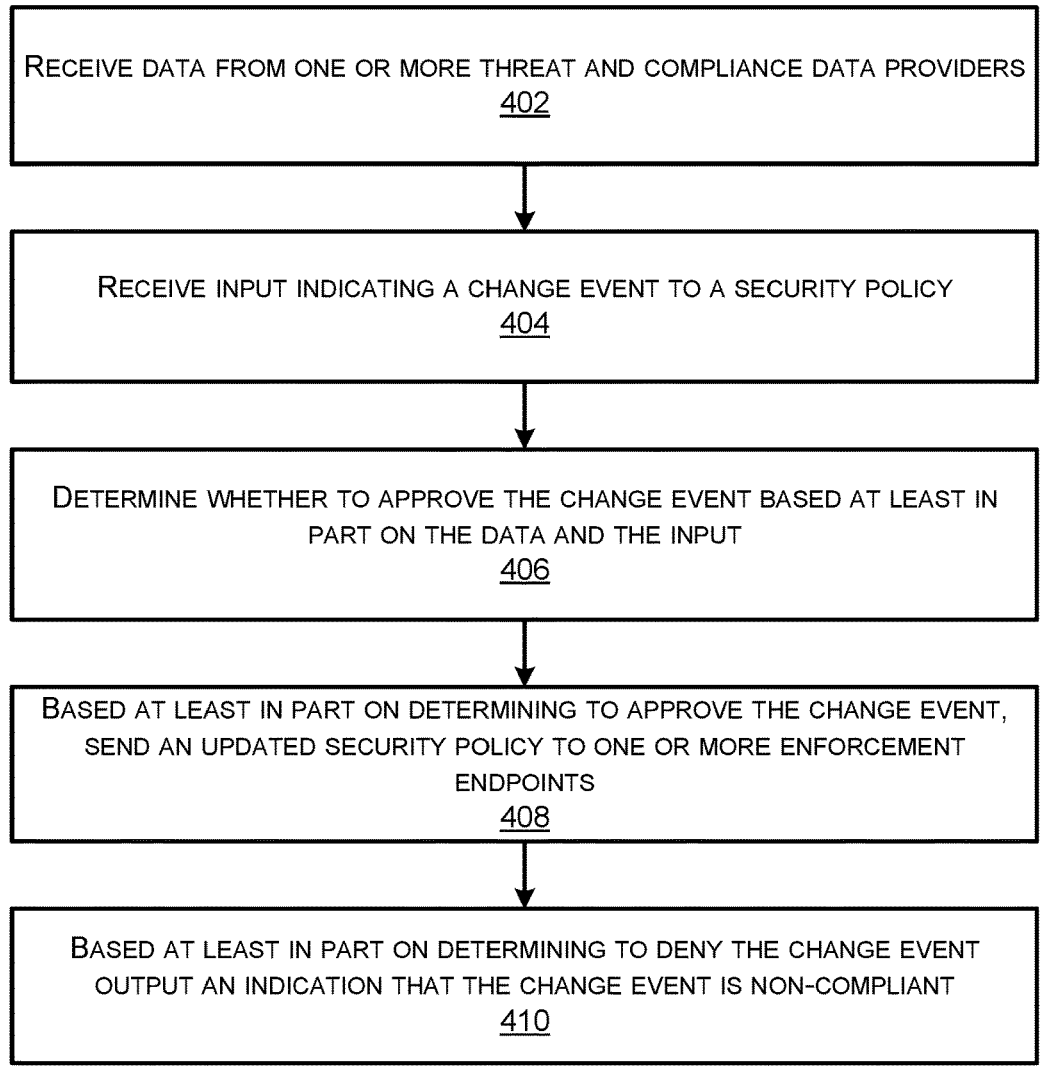
FIG. 4 illustrates a flow diagram of an example method for a dynamic security compliance system to perform active dynamic compliance

FIG. 4 illustrates a flow diagram of an example system 400 for a dynamic security compliance system to perform active dynamic compliance. In some instances, the steps of system 400 may be performed by one or more devices (e.g., centralized network security policy manager 108, threat and compliance crawler 106, etc.) that include one or more processors and one or more non-transitory computer-readable media storing computer-executable instructions that, when executed by the one or more processors, cause the one or more processors to perform operations of system 400.

At 402, the system may receive data from one or more threat and compliance data providers. For instance, the data may comprise threat data and/or compliance data 116 as described above. In some examples, the threat and compliance data provider(s) may comprise threat and compliance data provider(s) 114 described above. For instance, the one or more threat and compliance data providers comprise one or more of a proprietary threat intelligence threat and compliance data provider, an open source threat intelligence threat and compliance data provider, or an enterprise specific threat compliance threat and compliance data provider. In some examples, the system may collect the data using a threat and compliance crawler 106.

At 404, the system may receive input indicating a change event to a security policy. As noted above, the system may receive the input from an administrator of the network, such as via a user interface provided by the centralized network security policy manager 108. In some examples, the input indicates at least one of a modification to the one or more security policies or a request to add, modify, or remove a security policy.

At 406, the system may determine whether to approve the change event based at least in part on the data and the input. For instance, the system may determine whether to approve the change event using the evaluation module 216 and/or active dynamic compliance enforcement module described above.

At 408, the system may, based at least in part on determining to approve the change event, send an updated security policy to one or more enforcement endpoints. For instance, the system may send the change event to an enforcement endpoint based on determining the change event will not open the network to threats.

At 410, the system may, based at least in part on determining to deny the change event, output an indication that the change event is non-compliant. In some examples, determining to deny the change event further comprises blocking and/or preventing the change event from being sent to an enforcement endpoint.

Figure 5:
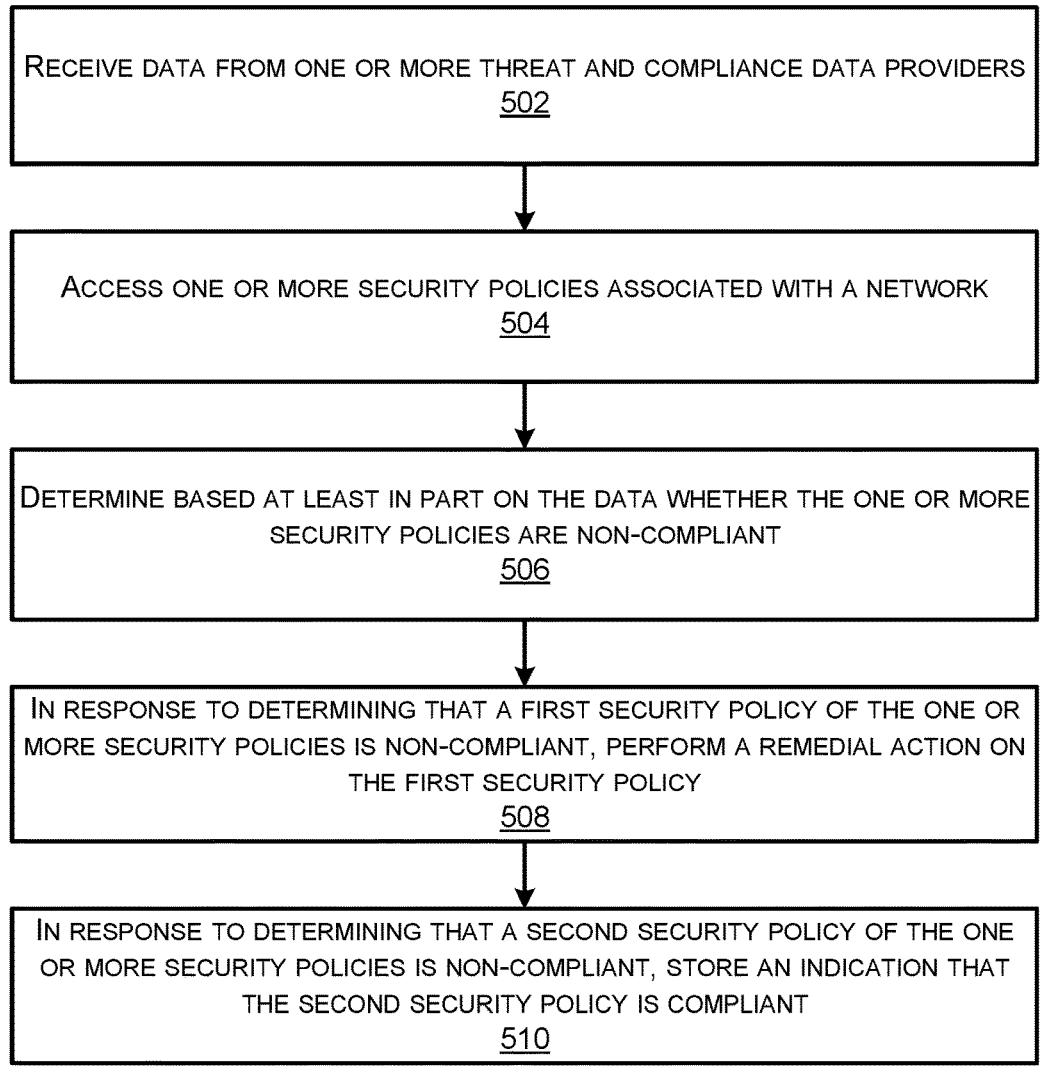
FIG. 5 illustrates a flow diagram of an example method for a dynamic security compliance system to perform reactive dynamic compliance.

FIG. 5 illustrates a flow diagram of an example system 500 for a dynamic security compliance system to perform reactive dynamic compliance. In some instances, the steps of system 500 may be performed by a device (e.g., centralized network security policy manager 108) that includes one or more processors and one or more non-transitory computer-readable media storing computer-executable instructions that, when executed by the one or more processors, cause the one or more processors to perform operations of system 500.

At 502, the system may receive data from one or more threat and compliance data providers. For instance, the data may comprise threat data and/or compliance data 116 as described above. In some examples, the threat and compliance data provider(s) may comprise threat and compliance data provider(s) 114 described above. For instance, the one or more threat and compliance data providers comprise one or more of a proprietary threat intelligence threat and compliance data provider, an open source threat intelligence threat and compliance data provider, or an enterprise specific threat compliance threat and compliance data provider. In some examples, the system may collect the data using a threat and compliance crawler 106.

At 504, the system may access one or more security policies associated with a network. For instance, the system may access the one or more security policies from the data store 216. In some examples the one or more security policies comprise existing security policies pre-configured by a network administrator.

At 506, the system may determine, based at least in part on the data, whether the one or more security policies are non-compliant. For instance, the system may determine compliance of the security policies using the evaluation module and/or reactive dynamic compliance enforcement module described above.

At 508, the system may, in response to determining that a first security policy of the one or more security policies is non-compliant, perform a remedial action on the first security policy. In some examples, the remedial action(s) may comprise one or more of a change in a security policy, disallowing access to a particular IP address, disallowing access to a particular domain, disallowing access to a particular URL, or any other suitable remedial action). In some examples, the remedial action may comprise updating the first security policy based at least in part on the threat data and sending the updated first security policy to one or more enforcement endpoints (e.g., edge device(s), end point device(s), cloud(s), etc.).

At 510, the system may, in response to determining that a second security policy of the one or more security policies is compliant, store an indication that the second security policy is compliant.

Figure 6:
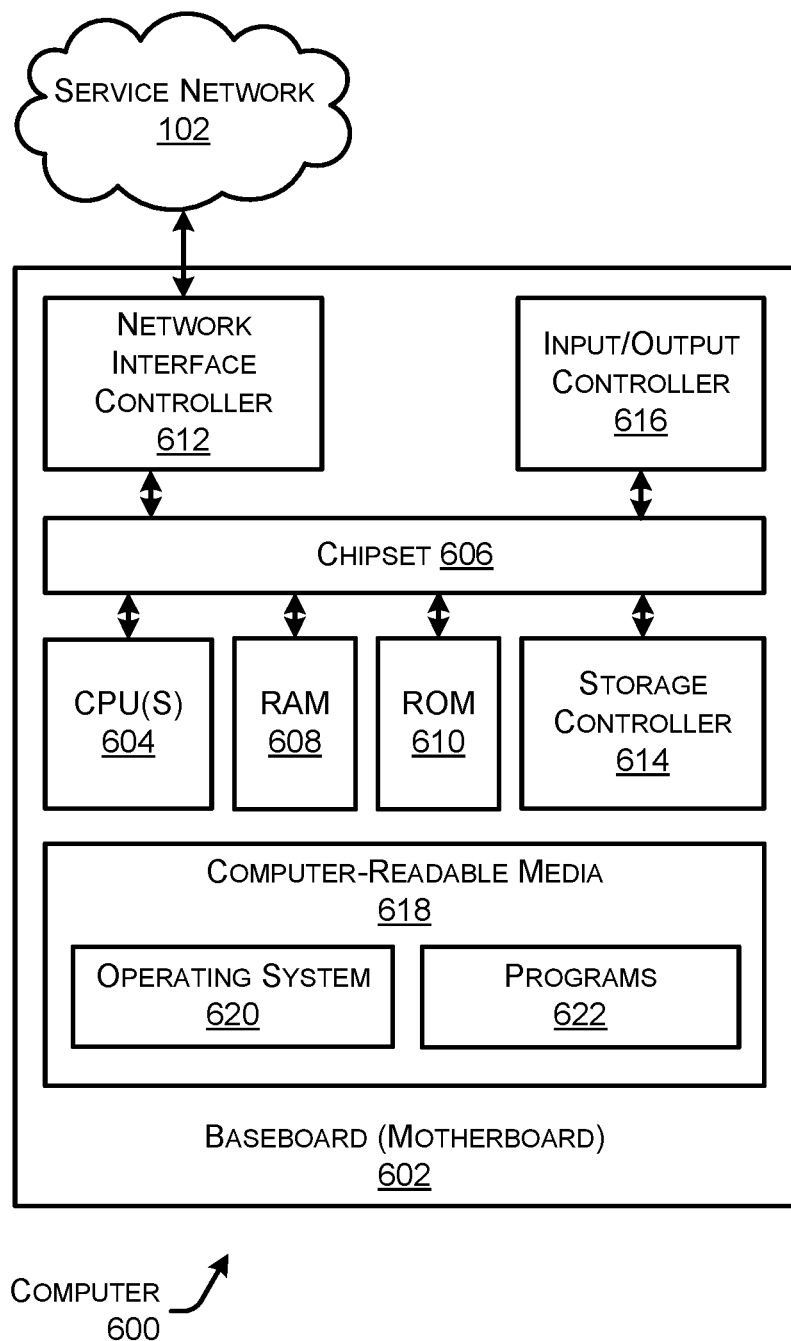
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to an centralized network security policy manager 108, a threat and compliance crawler 106, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as service network 102. The chipset 606 can include functionality for providing network connectivity through a NIC 612, such as a gigabit Ethernet adapter. The NIC 612 is capable of connecting the computer 600 to other computing devices over the local network 108. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the centralized network security policy manager 108, the threat and compliance crawler 106, and/or any components included therein, may be supported by one or more devices similar to computer 600. Stated otherwise, some or all of the operations performed by the centralized network security policy manager 108, the threat and compliance crawler 106, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a centralized network security policy manager 108, the threat and compliance crawler 106, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the centralized network security policy manager 108, the threat and compliance crawler 106, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for defining a "dynamic security compliance" model and architecture for dynamic networks that proactively prevent security policy violations, retroactively identifies security policy violations within a changing threat landscape, and provides auto-remediation of the security policies as necessary. For instance, the programs 622 may cause the computer 600 to perform techniques for active dynamic compliance enforcement of security policies within a network, including: receiving threat data from one or more threat and compliance data providers; receiving input indicating a change event to one or more security policies within a network; determining whether to approve the change event based at least in part on the threat data and the input; and based at least in part on determining to approve the change event, sending an updated security policy to one or more enforcement endpoints; or based at least in part on determining to deny the change event, outputting an indication that the change event is non-compliant. Additionally, the programs 622 may comprise instructions that cause the computer 600 to perform the specific techniques for reactive dynamic compliance enforcement of security policies within a network.

In this way, the system can enable dynamic compliance by enabling security policies to automate themselves to be secure from dynamically changing threats. Additionally, by proactively denying security policy changes that are non-compliant from being implemented, the system prevents the network from being open to threats and improves security. Moreover, by retroactively and continuously identifying non-compliant security policies and providing remedial actions, the system provides an automated dynamic retroactive compliance which previously was not available. Further, by utilizing enterprise specific data (e.g., such as sanctions, and other information), the claimed techniques ensure that security policies stay compliant in a dynamic threat landscape.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented at least in part by centralized network security manager comprising:
   receiving threat data from one or more threat and compliance data providers;
   receiving input indicating a change event that is to be applied to one or more security policies that exist within a network, the change event including a modification to the one or more security policies that remediates a threat to the network indicated in the threat data;
   prior to the change event being applied to the one or more security policies, determining whether to approve the change event and implement the modification to the one or more security policies, the determining whether to approve the change event including:
      determining whether the modification to the one or more security policies opens the network to attack; or
      determining whether the modification to the one or more security policies violates a compliance policy associated with the network; and
   based at least in part on determining to deny the change event, refraining from implementing the modification to the one or more security policies.

2. The method of claim 1, wherein the one or more threat and compliance data providers comprise one or more of a proprietary threat intelligence threat and compliance data provider, an open source threat intelligence threat and compliance data provider, or an enterprise specific threat compliance threat and compliance data provider.

3. The method of claim 1, wherein the threat data further comprises compliance data.

4. The method of claim 1, wherein the input is received from an administrator of the network.

5. The method of claim 1, wherein the threat data is received from a threat and compliance crawler module.

6. The method of claim 1, wherein the input indicates at least one of a modification to the one or more security policies or a request to add, modify, or remove a security policy.

7. The method of claim 1, wherein determining to deny the change event further comprises blocking the change event from being sent to an enforcement endpoint.

8. A system comprising:
   one or more processors; and
   one or more non-transitory computer-readable media storing computer-executable instructions that, when executed by the one or more processors, cause the one or more processors to perform operations comprising:
      receiving threat data from one or more threat and compliance data providers;
      receiving input indicating a change event that is to be applied to one or more security policies that exist within a network, the change event including a modification to the one or more security policies that remediates a threat to the network indicated in the threat data;
      prior to the change event being applied to the one or more security policies, determining whether to approve the change event and implement the modification to the one or more security policies, the determining whether to approve the change event including:
         determining whether the modification to the one or more security policies opens the network to attack; or determining whether the modification to the one or more security policies violates a compliance policy associated with the network; and based at least in part on determining to deny the change event, refraining from implementing the modification to the one or more security policies.

9. The system of claim 8, wherein the one or more threat and compliance data providers comprise one or more of a proprietary threat intelligence threat and compliance data provider, an open source threat intelligence threat and compliance data provider, or an enterprise specific threat compliance threat and compliance data provider.

10. The system of claim 8, wherein the threat data further comprises compliance data.

11. The system of claim 8, wherein the input is received from an administrator of the network.

12. The system of claim 8, wherein the threat data is received from a threat and compliance crawler module.

13. The system of claim 8, wherein the input indicates at least one of a modification to the one or more security policies or a request to add, modify, or remove a security policy.

14. The system of claim 8, wherein determining to deny the change event further comprises blocking the change event from being sent to an enforcement endpoint.

15. One or more computing devices running a centralized network security manager, the one or more computing devices comprising:

one or more processors; and one or more non-transitory computer-readable media storing computer-executable instructions that, when executed by the one or more processors, cause the one or more processors to perform operations comprising:

receiving threat data from one or more threat and compliance data providers;

receiving input indicating a change event that is to be applied to one or more security policies that exist within a network, the change event including a modification to the one or more security policies that remediates a threat to the network indicated in the threat data;

prior to the change event being applied to the one or more security policies, determining whether to approve the change event and implement the modification to the one or more security policies, the determining whether to approve the change event including:

determining whether the modification to the one or more security policies opens the network to attack; or determining whether the modification to the one or more security policies violates a compliance policy associated with the network; and based at least in part on determining to deny the change event, refraining from implementing the modification to the one or more security policies.

16. The one or more computing devices of claim 15, wherein the one or more threat and compliance data providers comprise one or more of a proprietary threat intelligence threat and compliance data provider, an open source threat intelligence threat and compliance data provider, or an enterprise specific threat compliance threat and compliance data provider.

17. The one or more computing devices of claim 15, wherein the threat data further comprises compliance data.

18. The one or more computing devices of claim 15, wherein the input is received from an administrator of the network.

19. The one or more computing devices of claim 15, wherein the threat data is received from a threat and compliance crawler module.

20. The one or more computing devices of claim 15, wherein the input indicates at least one of a modification to the one or more security policies or a request to add, modify, or remove a security policy.

* * * * *